United States Patent [19]

D'Souza

[11] Patent Number: 5,666,523

[45] Date of Patent: Sep. 9, 1997

[54] METHOD AND SYSTEM FOR DISTRIBUTING ASYNCHRONOUS INPUT FROM A SYSTEM INPUT QUEUE TO REDUCE CONTEXT SWITCHES

[75] Inventor: David D'Souza, Kirkland, Wash.

[73] Assignee: Microsoft Corporation, Redmond, Wash.

[21] Appl. No.: 553,824

[22] Filed: Nov. 6, 1995

Related U.S. Application Data

[63] Continuation of Ser. No. 268,494, Jun. 30, 1994, abandoned.

[51] Int. Cl.$^6$ .................................................. G06F 9/46
[52] U.S. Cl. ............................................ 395/570; 395/678
[58] Field of Search .................................... 395/570, 678

[56] References Cited

U.S. PATENT DOCUMENTS

| | | |
|---|---|---|
| 4,972,312 | 11/1990 | den Boef . |
| 5,008,812 | 4/1991 | Bhandarkar et al. ............... 395/569 |
| 5,016,166 | 5/1991 | Van Loo et al. . |
| 5,127,098 | 6/1992 | Rosenthal et al. . |
| 5,144,692 | 9/1992 | Baker et al. . |
| 5,161,226 | 11/1992 | Wainer . |
| 5,297,283 | 3/1994 | Kelly, Jr. et al. . |
| 5,345,588 | 9/1994 | Greenwood et al. . |
| 5,388,219 | 2/1995 | Chan et al. . |
| 5,490,272 | 2/1996 | Mathis et al. ....................... 395/678 |

OTHER PUBLICATIONS

Unstable Threads' Kernel Interface for Minimizing the Overhead of Thread Switching, by Inohara et al. 1993, IEEE 149–155.

Parallel Multi–Context Architecture with High–Speed Synchronization Mechanism by Toda, IEEE 1991 Publication pp. 336–343.

Microsoft® Win32™0 Preliminary SDK for Windows NT™, Programmer's Reference: Overviews, Microsoft Corporation, 1992, pp. 79–95.

Windows NT Resource Guide, Microsoft® Window NT™ Preliminary Release, Microsoft Corporation, 1993, pp. 23–29.

"How Windows NT Deserializes Input," Advanced Windows NT, 1992–1995, pp. 1–4.

Primary Examiner—Krisna Lim
Attorney, Agent, or Firm—Seed and Berry LLP

[57] ABSTRACT

A method and system for reducing context switches when distributing input to applications are provided. When input is received, it is stored in a system input queue. A system thread distributes the input stored in the system input queue to appropriate thread input queues. Before the system thread can execute code to process system input, the system thread must obtain ownership of a synchronization mechanism. To eliminate unnecessary context switches, the operating system determines whether the synchronization mechanism is already owned before scheduling the system thread to execute and performing a context switch from the context of the currently executing thread to the context of the system thread. If the synchronization mechanism is not already owned, the system thread is granted ownership and distributes the input stored in the system input queue to the appropriate thread input queues. If the synchronization mechanism is already owned, the thread that already owns the synchronization mechanism distributes the input stored in the system input queue to the appropriate thread input queues.

3 Claims, 5 Drawing Sheets

METHOD AND SYSTEM FOR DISTRIBUTING ASYNCHRONOUS INPUT FROM A SYSTEM INPUT QUEUE TO REDUCE CONTEXT SWITCHES

CROSS-REFERENCE TO RELATED APPLICATION

This application is a continuation of U.S. pat. application Ser. No. 08/268,494, filed Jun. 30,1994, now abandoned.

FIELD OF THE INVENTION

This invention relates generally to computer systems that accept input and, more particularly, to a method and system for reducing the number of context switches when distributing input to applications.

BACKGROUND OF THE INVENTION

Application programs typically require input from a user. This user input is entered through an input/output ("I/O") device, such as a keyboard or a mouse. An operating system provides the interface between application programs and the components of a computer system, including I/O devices. The operating system receives the user input and then distributes the user input to the application program to which it is directed.

Many operating systems support multitasking. A task is a stand-alone application program or a subprogram that is run as an independent entity. Multitasking is the ability of a computer system to have more than one task in memory at a time and to switch which task the central processing unit ("CPU") is currently executing to improve the efficiency of the computer system's components. With a multitasking operating system, the receipt of user input must be coordinated among all the tasks that are in the process of executing.

One model for coordinating the receipt and distribution of user input is the synchronous input model. Under the synchronous input model, all user input is stored in a system input queue, and the task that has control of the CPU is the only task that can retrieve input from the system input queue. The primary disadvantage of a synchronous input model is if the task that has control of the CPU stops retrieving input from the system input queue for some reason, all other tasks are blocked from retrieving input from the system input queue. Thus, one malfunctioning task affects the entire system.

To eliminate the problems associated with a synchronous input model, an asynchronous input model was developed. Under the asynchronous input model, all user input is only initially stored in a system input queue. The operating system then reads the input from the system input queue, determines to which task the input is directed, and stores the input in a task input queue corresponding to that task. When a particular task has control of the CPU, the task can retrieve input from its own input queue. If one task stops retrieving input from its input queue, the other tasks can still retrieve input from their input queues. Thus, one malfunctioning task cannot affect the entire system.

In some asynchronous input models, the component of the operating system responsible for distributing input from the system input queue to the appropriate task input queue is a system thread. When the system thread is not distributing input, the system thread remains inactive in the background. Then, when input is received and stored in the system input queue, the system thread is scheduled to execute and a context switch is performed to switch from the context of the currently executing thread (such as a thread created to execute an application program) to the context of the system thread. A scheduler is responsible for scheduling all of the threads, including the system thread. In order to perform the context switch, the scheduler: (1) suspends the execution of the currently executing thread, (2) saves the context (i.e., the machine state—registers, stacks, etc.) of the suspended thread, (3) restores the context of the system thread (which has been waiting in the background), and (4) begins the execution of the system thread. Because each of these steps must be performed for every context switch, context switches are computationally expensive and time consuming. Thus, it would be desirable to reduce the number of context switches that must be performed in order to distribute the input stored in the system input queue.

SUMMARY OF THE INVENTION

One aspect of the present invention provides a method and system for reducing the number of context switches when distributing input to applications. Generally, a system thread distributes the input. In certain circumstances, however, a currently executing thread distributes the input on behalf of the system thread. Specifically, if the currently executing thread already owns a synchronization mechanism when the input is received, the currently executing thread distributes the input. Ownership of the synchronization mechanism must be obtained before any thread can distribute the input. Since the currently executing thread already owns the synchronization mechanism, having the currently executing thread distribute the input on behalf of the system thread eliminates an unnecessary context switch from the context of the currently executing thread to the context of the system thread.

In a preferred embodiment, when the input is received, it is stored in a system input queue. The system thread executes on behalf of an operating system to distribute the input stored in the system input queue to appropriate thread input queues. Before the system thread can distribute the input stored in the system input queue, however, the system thread must be scheduled to execute and a context switch must be performed to switch from the context of the currently executing thread to the context of the system thread. Additionally, before the system thread can execute code to process system input, the system thread must request and obtain ownership of the synchronization mechanism.

To eliminate unnecessary context switches, the present invention determines whether the synchronization mechanism is already owned before scheduling the system thread to execute and performing the context switch from the context of the currently executing thread to the context of the system thread. If the synchronization mechanism is not already owned, the system thread is granted ownership and distributes the input stored in the system input queue to the appropriate thread input queues. Otherwise, an input counter is incremented to indicate that input has been stored in the system input queue but not distributed by the system thread. Further, to ensure that all input stored in the system input queue is distributed, before any thread that already owns the synchronization mechanism releases ownership, the thread determines whether the input counter has been incremented. If the input counter has been incremented, the thread distributes the input stored in the system input queue to the appropriate thread input queues and then releases ownership of the synchronization mechanism. Thus, the method and system of the present invention reduce the number of context switches that must be performed when distributing input by utilizing threads that have already obtained ownership of the synchronization mechanism to distribute the input stored in the system input queue.

DETAILED DESCRIPTION OF THE PREFERRED EMBODIMENT

The preferred embodiment of the present invention provides a method and system for reducing the number of context switches when distributing input to applications. Generally, a system thread distributes the input. In certain circumstances, however, a currently executing thread distributes the input on behalf of the system thread. Specifically, if the currently executing thread already owns a synchronization mechanism when the input is received, the currently executing thread distributes the input. Ownership of the synchronization mechanism must be obtained before any thread can distribute the input. Since the currently executing thread already owns the synchronization mechanism, having the currently executing thread distribute the input on behalf of the system thread eliminates an unnecessary context switch from the context of the currently executing thread to the context of the system thread.

In the preferred embodiment, when the input is received, it is stored in a system input queue. The system thread executes on behalf of an operating system to distribute the input stored in the system input queue to appropriate thread input queues. Before the system thread can distribute the input stored in the system input queue, however, the system thread must be scheduled to execute and a context switch must be performed to switch from the context of the currently executing thread to the context of the system thread. Additionally, before the system thread can execute code to process system input, the system thread must request and obtain ownership of the synchronization mechanism.

To eliminate unnecessary context switches, the present invention determines whether the synchronization mechanism is already owned before scheduling the system thread to execute and performing the context switch from the context of the currently executing thread to the context of the system thread. If the synchronization mechanism is not already owned, the system thread is granted ownership and distributes the input stored in the system input queue to the appropriate thread input queues. If the synchronization mechanism is already owned, the thread that already owns the synchronization mechanism distributes the input stored in the system input queue to the appropriate thread input queues. Thus, the method and system of the present invention reduce the number of context switches that must be performed when distributing input by utilizing threads that have already obtained ownership of the synchronization mechanism to distribute the input stored in the system input queue.

Figure 1:
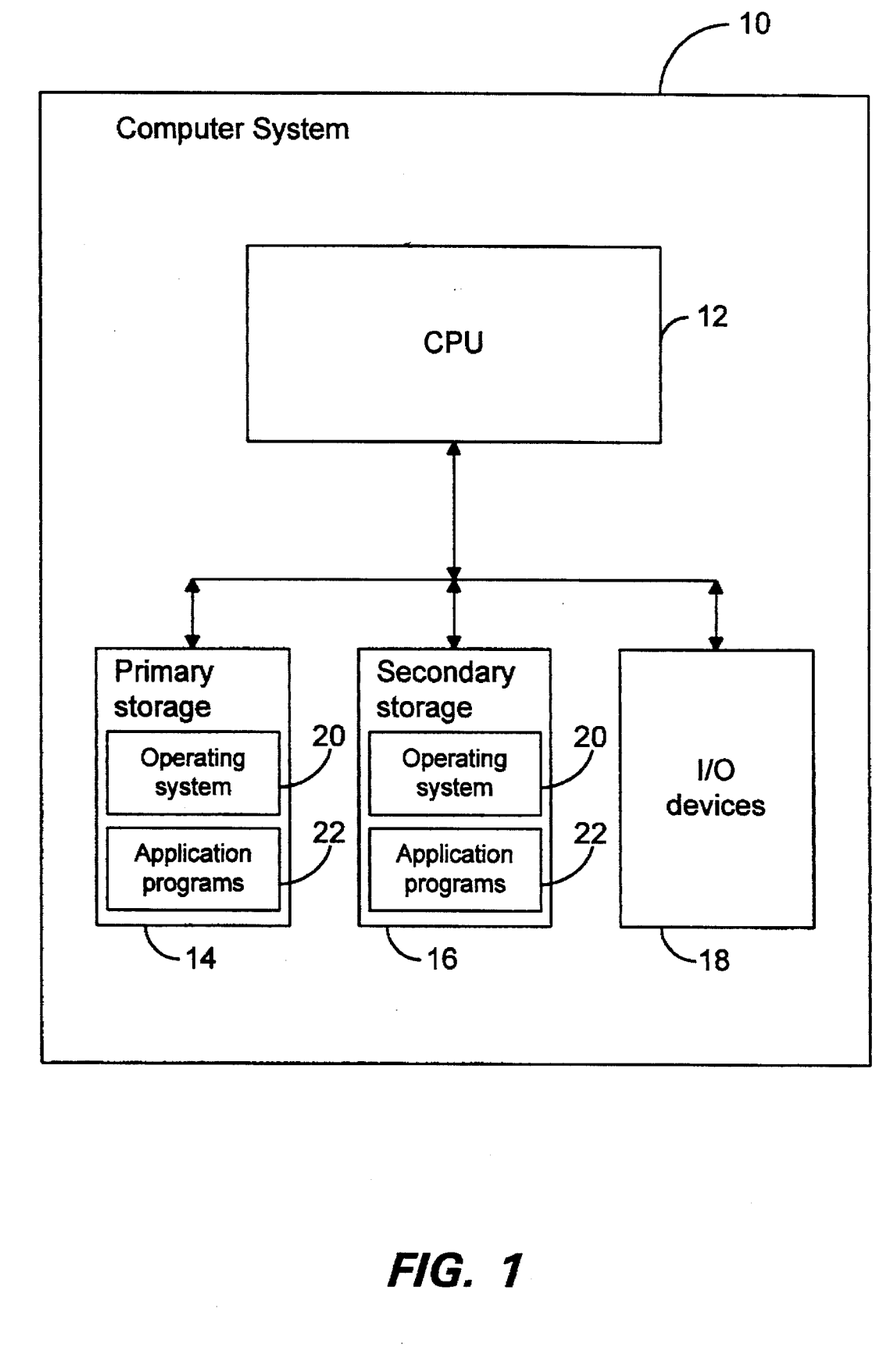
FIG. 1 is a block diagram that illustrates the components of a computer system in which the preferred embodiment of the present invention operates.

A computer system 10 in which the preferred embodiment of the present invention operates is illustrated in FIG. 1. The computer system 10 includes a CPU 12, a primary storage 14, a secondary storage 16, and I/O devices 18. An operating system 20 and application programs 22 are generally stored in the secondary storage 16 and are loaded into the primary storage 14 for execution by the CPU 12. The application programs 22 as illustrated are ready for execution from the primary storage 14. A program, such as an application program 22, that has been loaded into the primary storage 14 and prepared for execution by the CPU 12 is called a process. A process includes the code, data, and other resources that belong to a program. A path of execution in a process is called a thread. A thread includes a set of instructions, related CPU register values, and a stack. The thread is the entity that receives control of the CPU 12. A process has at least one thread. In a multithreaded operating system, a process can have more than one thread. Thus, a multithreaded operating system can improve the execution time of a process, but also creates more overhead due to the creation of additional threads.

Figure 2:
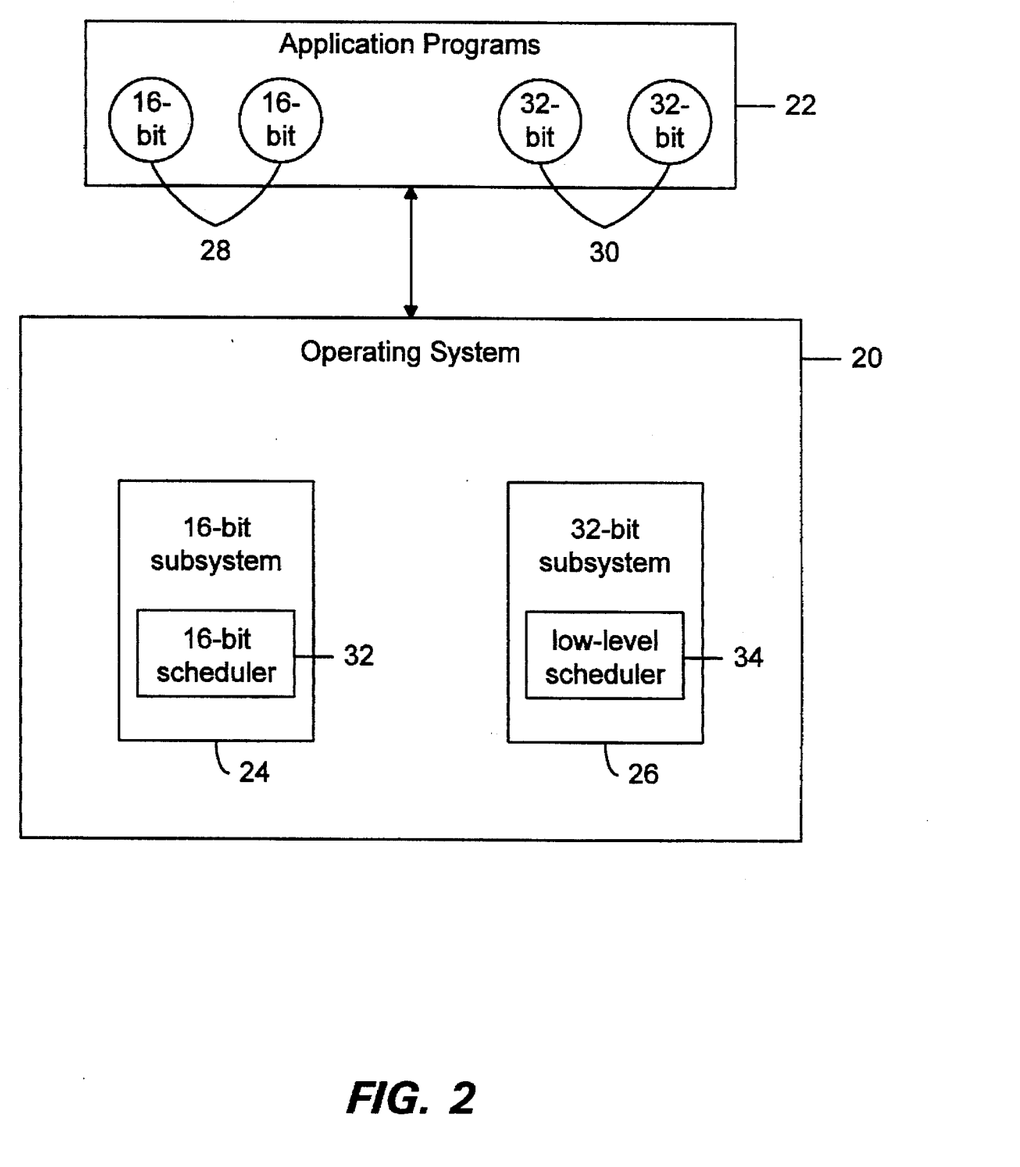
FIG. 2 is a block diagram that illustrates in more detail the components of the operating system of FIG. 1.

The components of the operating system 20 are illustrated in FIG. 2. In the preferred embodiment of the present invention, the operating system 20 includes a cooperative multitasking subsystem 24 and a preemptive multitasking subsystem 26. A cooperative multitasking operating system requires cooperation between tasks in order for the computer system to function properly. With a cooperative system, once a first task has been assigned control of the CPU, all other tasks are blocked (i.e., prevented from gaining control of the CPU) until the first task relinquishes control of the CPU. A preemptive multitasking operating system, on the other hand, does not require cooperation between tasks in order for the computer system to function properly. With a preemptive system, the system assigns control of the CPU to a task and then takes back control from the task when a specified time expires or a specified event occurs. In the preferred embodiment of the present invention, the cooperative multitasking subsystem 24 is a 16-bit system (and will be referred to as the "16-bit subsystem") and the preemptive multitasking subsystem 26 is a 32-bit system (and will be referred to as the "32-bit subsystem"). Thus, the application programs 22 include both cooperatively scheduled 16-bit applications 28 and preemptively scheduled 32-bit applications 30.

The operating system 20 is an enhanced version of the "MICROSOFT WINDOWS," version 3.1, operating system (hereinafter referred to as "WINDOWS 3.1"), sold by Microsoft Corporation of Redmond, Wash. WINDOWS 3.1 is a cooperative multitasking operating system. The operating system 20 in the preferred embodiment of the present invention provides a preemptive multitasking subsystem as an enhancement to the cooperative multitasking subsystem provided by WINDOWS 3.1. Such an enhanced version provides compatibility between applications written for earlier cooperative systems and applications written for more recent preemptive systems. While the present invention is being described with reference to an enhanced version of WINDOWS 3.1, those skilled in the art will appreciate that other operating systems, including distributed operating systems, may be used to practice the present invention. The choice of an enhanced version of WINDOWS 3.1 is merely illustrative.

The 16-bit subsystem 24 includes a 16-bit application programming interface ("API") that enables the 16-bit applications 28 to request and carry out low-level services provided by the operating system 20. Similarly, the 32-bit subsystem 26 includes a 32-bit API that enables the 32-bit applications 30 to request and carry out low-level services provided by the operating system 20. Furthermore, the 16-bit subsystem includes a 16-bit scheduler 32 that is responsible for handling the cooperative scheduling of the 16-bit applications 28, and the 32-bit subsystem 26 includes a low-level scheduler 34 that is responsible for handling the preemptive scheduling of the 32-bit applications 30. Such a 16-bit scheduler is provided by the "MICROSOFT WINDOWS," version 3.1, operating system, and such a low-level scheduler is provided by the "MICROSOFT WINDOWS NT" operating system, sold by Microsoft Corporation of Redmond, Wash.

Both the 16-bit API and the 32-bit API are implemented as a set of dynamic link libraries ("DLL's"). A DLL is a library module that contains executable code for performing various functions. The code for each function is stored within the DLL. When an application program contains a call to a function within a DLL, the DLL is dynamically linked to the application program at run time. Application programs use the functions in the DLL as if the functions were a part of the application program's code.

The DLL's that form the API's in the present invention are not reentrant. Code that is reentrant is not modifiable during run time and is written so that it can be shared by several threads. If one thread is executing reentrant code and another thread interrupts the execution of the first thread, the second thread can begin or continue execution of the same code without any code sharing or data sharing problems. Thus, more than one thread can be in the process of using a single DLL if the DLL is reentrant. The problem that occurs when a DLL is not reentrant is that the code is modifiable and the same code and data in the DLL are shared among all threads using the DLL. Consequently, if one thread is executing code in a non-reentrant DLL and another thread interrupts the execution of the first thread and attempts to begin or continue execution of the same code in the DLL, there may be code sharing or data sharing problems. Since the DLL's that form the API's in the present invention are not reentrant, a mechanism is provided to prevent a second thread from executing an API function before a first thread has completed execution of another API function.

The mechanism provided for protecting the shared code and data in the API's includes a synchronization mechanism in the form of a mutex. Those skilled in the art will appreciate that the present invention may also employ other synchronization mechanisms, such as critical sections or semaphores. A mutex is a data structure exclusive ownership of which can be used to prevent simultaneous use of a shared resource. In this case, the shared resource is the code and data in the API's. Those skilled in the art will appreciate that the mutex could be used to protect other shared resources. When a thread wants to use the code or the data in the API's, the thread requests ownership of the mutex. If the mutex is already owned by another thread, the requesting thread is blocked until ownership is released. Otherwise, the requesting thread is granted ownership.

The input system employed in the preferred embodiment of the present invention is a combination of a synchronous subsystem and an asynchronous subsystem. Input for 16-bit applications 28 is distributed using the synchronous subsystem, whereas input for 32-bit applications 30 is distributed using the asynchronous subsystem. Such an input system is provided by the MICROSOFT WINDOWS NT operating system. While the present invention is being described with reference to a combined synchronous/ asynchronous input system, those skilled in the art will appreciate that the principles of the present invention may be applied to other input systems, including a pure asynchronous input system.

Figure 3:
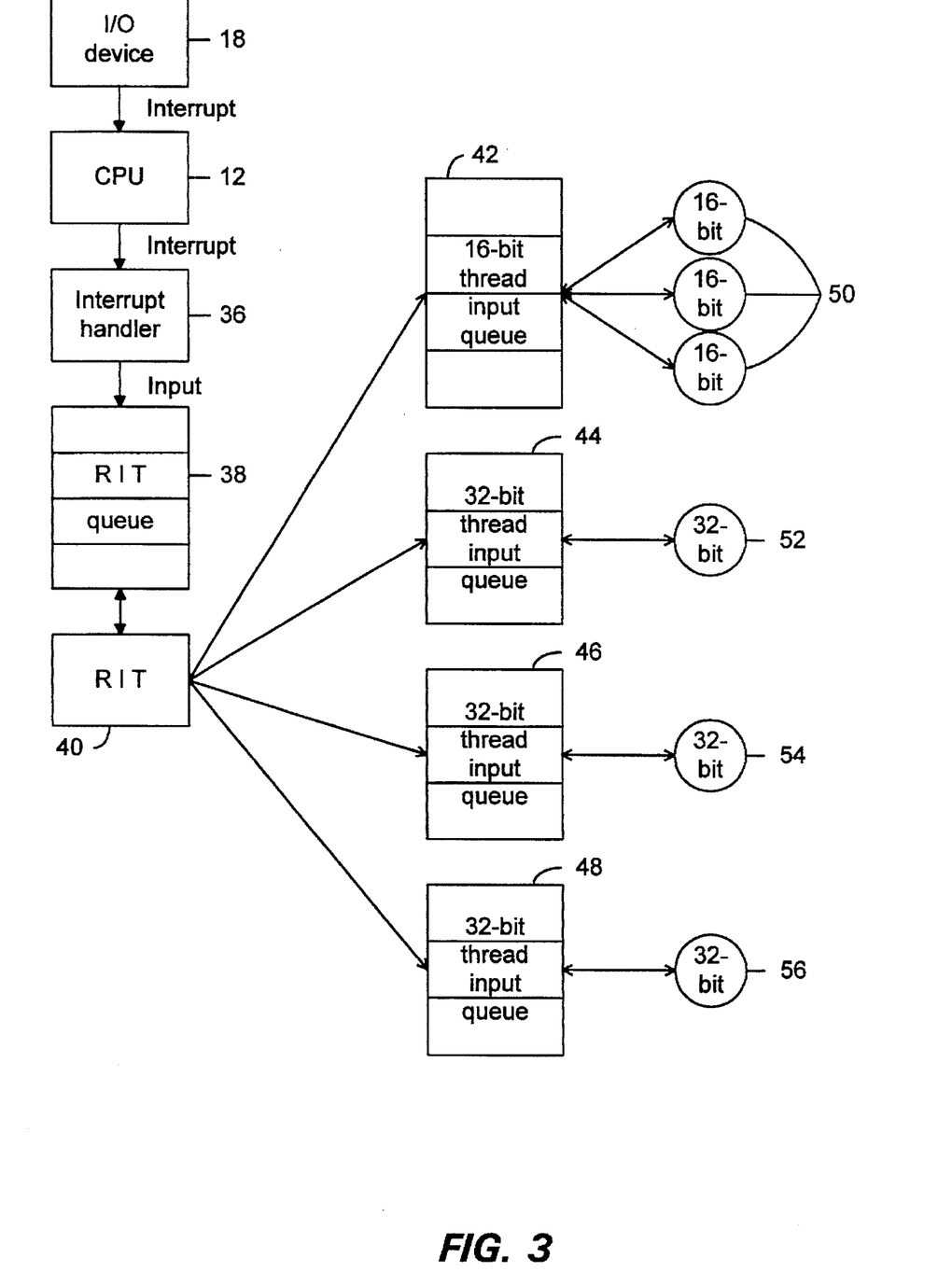
FIG. 3 is a block diagram that illustrates the combined synchronous/asynchronous input system employed in the preferred embodiment of the present invention.

The combined synchronous/asynchronous input system employed in the preferred embodiment of the present invention is illustrated in FIG. 3. Initially, a user enters input through the I/O device 18, such as a keyboard or a mouse. The I/O device 18 generates a hardware interrupt that is sent to the CPU 12. The CPU 12 detects the hardware interrupt and routes the interrupt to an interrupt handler 36. The interrupt handler 36 stores the input in a system input queue or raw input thread queue ("RIT queue") 38. A system thread or raw input thread ("RIT") 40 executes code to distribute the input stored in the RIT queue 38. Specifically, the RIT 40 executes code that determines to which thread the input is directed and stores the input in a 16-bit thread input queue 42 or a 32-bit thread input queue 44, 46, 48. This code could be stored as a function in a library or module that can be called by any thread.

There is only one input queue for all of the threads created for 16-bit applications, whereas there is one input queue for each of the threads created for 32-bit applications. Thus, if the input is directed to a 16-bit thread 50, the RIT 40 stores the input in the shared 16-bit thread input queue 42, and if the input is directed to a 32-bit thread 52, 54, 56, the RIT 40 stores the input in the corresponding 32-bit thread input queue 44, 46, 48. As a result, the 16-bit threads 50 must synchronously retrieve their input from the 16-bit thread input queue 42, while the 32-bit threads 52, 54, 56 can asynchronously retrieve their input from their respective 32-bit thread input queues 44, 46, 48.

Before the RIT 40 can distribute the input stored in the RIT queue 38, the RIT 40 must be scheduled to execute and a context switch must be performed to switch from the context of the currently executing thread to the context of the RIT 40. Additionally, because the RIT 40 accesses data in the API's, before the RIT can execute the code to process system input, the RIT 40 must request and obtain ownership of the mutex. If the RIT 40 requests ownership of the mutex and the mutex is already owned by another thread, the RIT 40 is blocked until ownership is released. Otherwise, the RIT 40 is granted ownership. If the RIT 40 is scheduled to execute and the context switch is performed, but the mutex is already owned so that the RIT 40 is blocked, the RIT 40 cannot distribute the input stored in the RIT queue 38. As a result, the context switch to the context of the RIT 40 was unnecessary because the thread that already owns the mutex can distribute the input stored in the RIT queue 38 on behalf of the RIT 40.

To eliminate such unnecessary context switches, the present invention determines whether the mutex is already owned before scheduling the RIT 40 to execute and performing the context switch from the context of the currently executing thread to the context of the RIT 40. If the mutex is not already owned, the RIT 40 is granted ownership and distributes the input stored in the RIT queue 38. Otherwise, an input counter (not shown) is incremented to indicate that input has been stored in the RIT queue 38 but not distributed by the RIT 40. Further, to ensure that all input stored in the RIT queue 38 is distributed, before any thread that already owns the mutex releases ownership of the mutex, the thread determines whether the input counter has been incremented. If the input counter has been incremented, the thread distributes the input stored in the RIT queue 38, resets the input counter, and releases ownership of the mutex. Otherwise, the thread releases ownership of the mutex.

Figure 4:
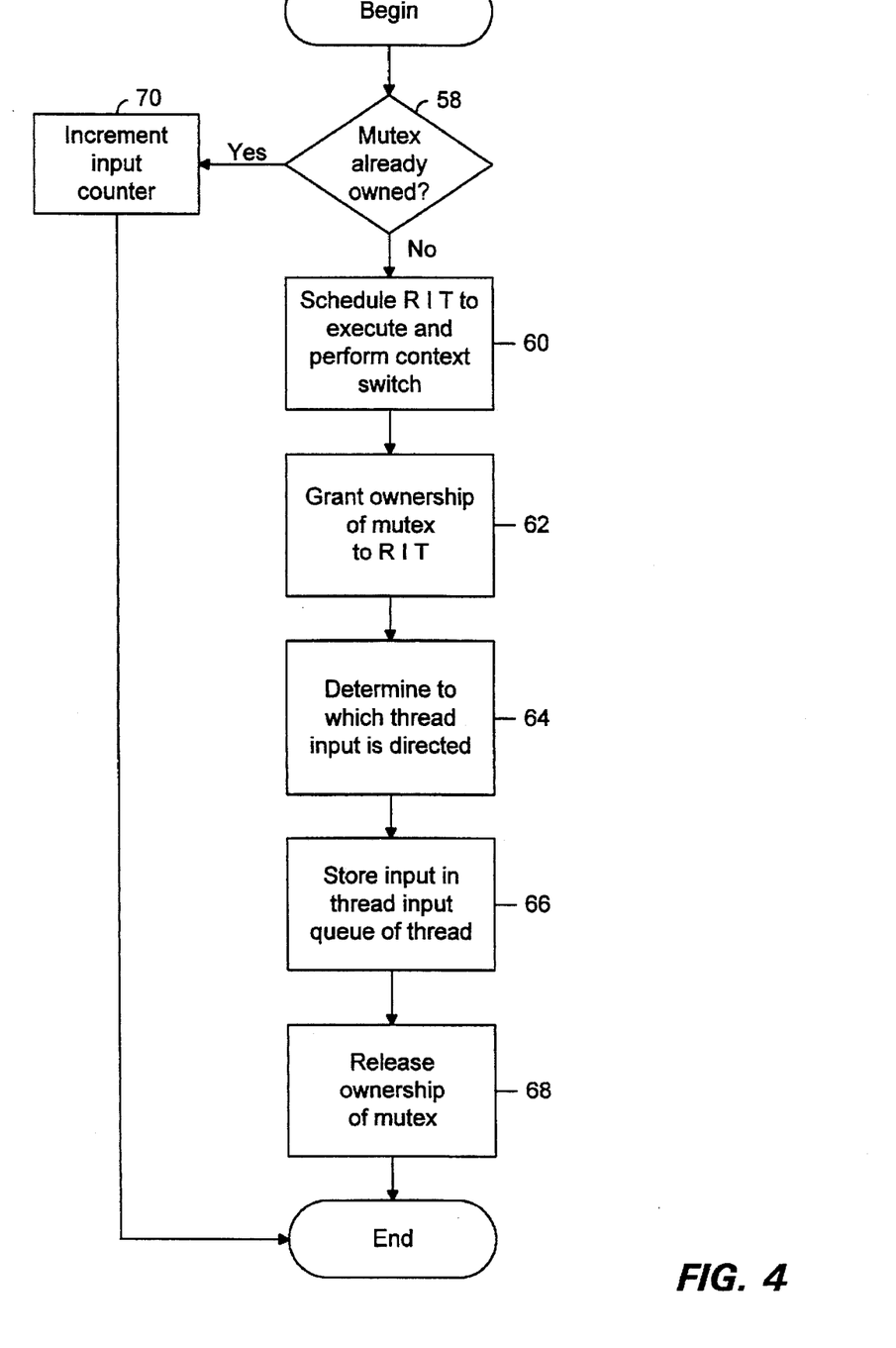
FIG. 4 illustrates the steps that are performed when input is stored in a raw input thread queue in accordance with the preferred embodiment of the present invention.

The steps that are performed after input is stored in the RIT queue 38 are illustrated in greater detail in FIG. 4. After input has been stored in the RIT queue 38, the operating system 20 determines whether the mutex is already owned by another thread (step 58). If the mutex is not already owned, the RIT 40 is scheduled to execute and the context switch is performed to switch from the context of the currently executing thread to the context of the RIT 40 (step 60). After the context switch is performed, the RIT 40 is granted ownership of the mutex (step 62). The RIT 40 then executes the code to distribute the input stored in the RIT queue 38. Specifically, the RIT 40 executes the code that determines to which thread the input is directed (step 64) and stores the input in the thread input queue of the thread to which the input is directed (step 66). For example, keyboard input is stored in the thread input queue of the thread that created the window that has the keyboard focus, and mouse input is stored in the thread input queue of the thread that created the window that contains the mouse cursor hot spot. After the RIT 40 has distributed the input stored in the RIT queue 38, the RIT 40 releases ownership of the mutex (step 68). If the mutex is already owned, the RIT 40 is not scheduled to execute and the context switch is not performed. Instead, the input counter (which was initially set equal to zero) is incremented to indicate that input has been stored in the RIT queue 38 but not distributed by the RIT 40 (step 70).

Figure 5:
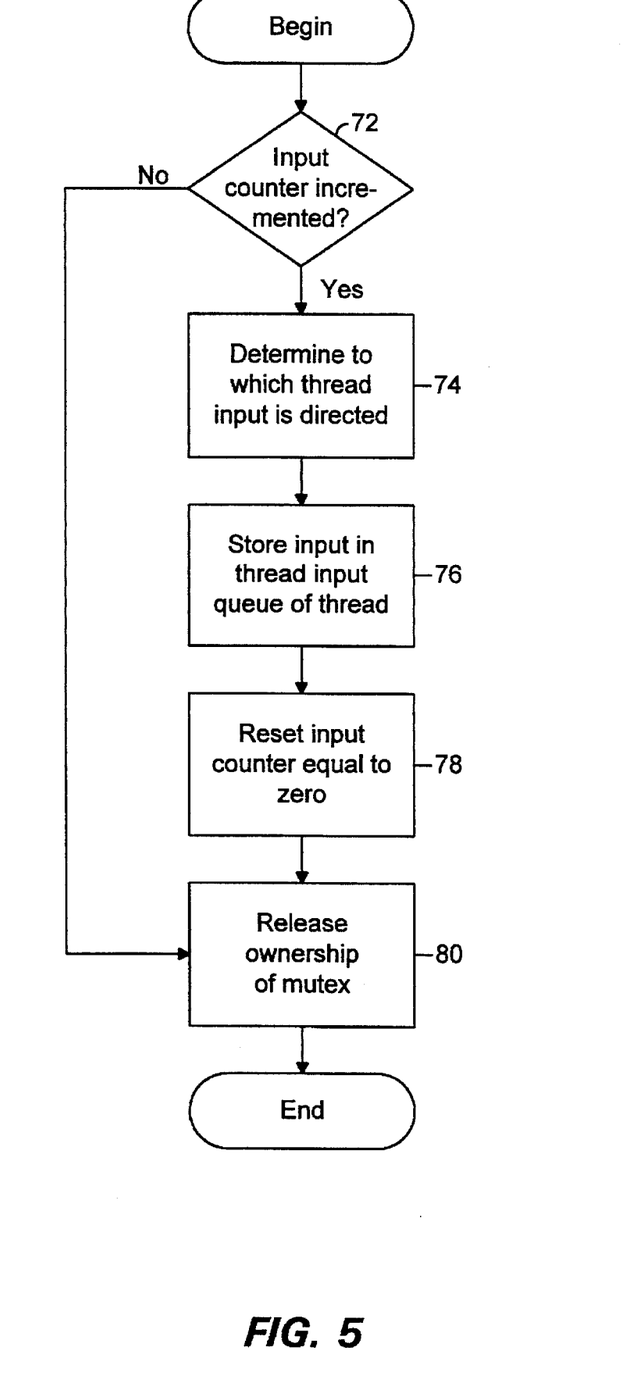
FIG. 5 illustrates the steps that are performed before a thread that owns a mutex releases the mutex in accordance with the preferred embodiment of the present invention.

The steps that are performed before a thread that already owns the mutex releases ownership of the mutex are illustrated in greater detail in FIG. 5. After completing execution of its own code, the thread that already owns the mutex determines whether the input counter has been incremented (i.e., whether the input counter is greater than zero) (step 72). If the input counter has been incremented, the thread that already owns the mutex executes the code to distribute the input stored in the RIT queue 38 on behalf of the RIT 40. Specifically, the thread that already owns the mutex executes the code that determines to which thread the input is directed (step 74) and stores the input in the thread input queue of the thread to which the input is directed (step 76). After the thread has distributed the input stored in the RIT queue 38, the thread resets the input counter equal to zero (step 78) and releases ownership of the mutex (step 80). If the input counter has not been incremented (i.e., is equal to zero), there is no input to distribute and the thread that already owns the mutex releases ownership of the mutex (step 80).

While the preferred embodiment of the present invention has been described with reference to a RIT queue and an input counter that is incremented to indicate that input has been stored in the RIT queue but not distributed by the RIT, one of ordinary skill in the art will appreciate that other types of data structures for storing the input and other types of input indicators may be used. For example, when input is received, the input is stored in a linked list (instead of the RIT queue) having a pointer to the beginning of the list and a pointer to the end of the list. Then, if the mutex is already owned when the input is stored in the linked list, an input indicator is set to indicate that input has been stored in the list but not distributed by the RIT. Further, before any thread that already owns the mutex releases ownership of the mutex, the thread determines whether the input indicator has been set. If the input indicator has been set, the thread distributes the input stored in the linked list until the thread reaches the end of the list or until a maximum number of input has been distributed and resets the input indicator.

One of ordinary skill in the art will now appreciate that the present invention provides a method and system for reducing the number of context switches when distributing input to applications. The method and system reduce the number of context switches by utilizing threads that have already obtained ownership of the synchronization mechanism to distribute the input stored in the system input queue. Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. In a computer system comprising a processor executing a multithreaded operating system, a memory in which a plurality of threads are loaded, and an input/output device for entering input directed to the threads, a system for reducing context switches when distributing the input to the threads, the system comprising:

a system input queue for storing input when it is received;

a thread input queue for each thread for storing input directed to the thread;

a system thread for executing code for distributing input from the system input queue to the thread input queue of the thread to which the input is directed;

a synchronization mechanism for the code for distributing input from the system input queue, wherein the system thread must determine whether the synchronization mechanism is already owned before the system thread can begin executing;

a selected thread that owns the synchronization mechanism; and a mechanism for the selected thread to determine that input has been received in the system input queue and for, in response to input being received, calling the code for distributing input from the selected thread to avoid a context switch.

2. In a computer system comprising a processor executing a multithreaded operating system, a memory in which a plurality of threads are loaded, and an input-output device for entering input directed to the threads, a method for reducing context switches when distributing the input to the threads, the method comprising the steps of:

providing a system input queue for storing input when it is received;

providing a thread input queue for each thread for storing input directed to the thread;

providing a system thread for executing code for distributing input from the system input queue to the thread input queue of the thread to which the input is directed;

providing a synchronization mechanism for the code for distributing input from the system input queue, wherein the system thread must determine whether the synchronization mechanism is already owned before the system thread can begin executing;

executing the threads on the processor;

granting ownership of the synchronization mechanism to a selected one of the threads other than the system thread;

entering input directed to an executing thread through the input/output device;

when the input is received, storing the input in the system input queue; and with the selected thread, calling the code for distributing input from the system input queue to avoid a context switch.

3. In a computer system that executes a multi-threaded operating system, wherein the computer system includes an input device for entering input, and a system input queue for holding input from the input device, a method comprising the computer implemented steps of:

provided code for distributing input from the system input queue to destinations;

providing a system thread that calls the code for distributing input from the system input queue to destinations to clear the input from the system input queue;

providing an ownable synchronization mechanism for synchronizing access to the code for distributing input from the system input queue to destinations;

granting ownership of the synchronization mechanism to a selected thread; and calling the code for distributing input from the system input queue to destinations from the selected thread if there is input to be distributed in the system input queue.

* * * * *